United States Patent [19]

Vorse et al.

[11] Patent Number: 5,902,645
[45] Date of Patent: May 11, 1999

[54] AQUEOUS PROTECTIVE AND ADHESION PROMOTING COMPOSITION

[75] Inventors: Dennis J. Vorse, Girard, Pa.; Victor E. Ferrell, Fuquay-Varina, N.C.; Joseph H. Gausman, Erie, Pa.

[73] Assignee: Lord Corporation, Cary, N.C.

[21] Appl. No.: 09/038,867

[22] Filed: Mar. 11, 1998

Related U.S. Application Data

[62] Division of application No. 08/548,854, Oct. 26, 1995, Pat. No. 5,728,203.

[51] Int. Cl.$^6$ .............................. B05D 3/00; B32B 15/08
[52] U.S. Cl. ........................ 427/387; 427/409; 427/410; 428/413; 428/425.5; 428/447
[58] Field of Search ..................... 422/387, 409, 422/410; 428/413, 425.5, 447

[56] References Cited

U.S. PATENT DOCUMENTS

| | | | |
|---|---|---|---|
| 3,022,196 | 2/1962 | Jenkins et al. | 117/127 |
| 3,816,184 | 6/1974 | Redmore et al. | 148/6.15 |
| 4,098,749 | 7/1978 | Hoshino et al. | 260/30.6 R |
| 4,113,665 | 9/1978 | Law et al. | 260/37 SB |
| 4,652,467 | 3/1987 | Brinker et al. | 427/246 |
| 4,727,127 | 2/1988 | Suzuki | 528/18 |
| 5,053,081 | 10/1991 | Jacob | 106/287.11 |
| 5,091,468 | 2/1992 | Takeuchi | 524/761 |
| 5,169,539 | 12/1992 | Turoscy et al. | 210/712 |
| 5,175,027 | 12/1992 | Holmes-Farley et al. | 427/387 |
| 5,178,675 | 1/1993 | Sexsmith | 106/287.11 |
| 5,182,143 | 1/1993 | Holmes-Farley et al. | 427/409 |
| 5,366,567 | 11/1994 | Ogino et al. | 148/258 |
| 5,371,165 | 12/1994 | Patrick et al. | 528/23 |
| 5,393,353 | 2/1995 | Bishop | 148/253 |

FOREIGN PATENT DOCUMENTS

| | | | |
|---|---|---|---|
| A 2392094 | 12/1978 | France. | |
| 4403876 A1 | 8/1994 | Germany | C23F 11/167 |
| 52-137439 | 11/1977 | Japan | C09D 5/12 |
| 53-042220 | 4/1978 | Japan. | |
| 55-142063 | 11/1980 | Japan. | |
| 56-125462 | 10/1981 | Japan. | |
| 56-125464 | 10/1981 | Japan. | |
| 59-162279 | 9/1984 | Japan. | |

OTHER PUBLICATIONS

Chemical Abstracts, vol. 100, No. 26; (Jun. 25, 1984) Columbus, Ohio, Abstract No. 213933b Nippon Shokububai; *Metal Surface Treatment*; p. 242.

CA 105:138325, Illarioonov et al, "Cold–hardening mixture for making foundry molds and cores", (Jun. 23, 1986).

CA 126:105549, Oono et al., "Primer Compositions With Improved Adhesion Strength", (Nov. 19, 1996).

Avnir & Kaufman, "Alcohol is an Unneessary Additive in the Silicon Alkoxide Sol–Gel Process" 192 Journal of Non–Crystalline Solids 180–182 (1987) no month avail.

*Primary Examiner*—David Brunsman
*Attorney, Agent, or Firm*—Wayne W. Rupert

[57] ABSTRACT

An aqueous composition for coating a metallic substrate that is prepared by mixing at least one silane (preferably at least two silanes), at least about 20 weight percent phosphoric acid based on the total weight of the composition, and water, wherein the composition is substantially free of an organic solvent and a chromium-containing compound. The pH of the composition must not be above 3. The composition can be coated on a metallic substrate, particularly an aluminum substrate, to provide a pre-treatment layer for adhering overcoats.

18 Claims, No Drawings

AQUEOUS PROTECTIVE AND ADHESION PROMOTING COMPOSITION

This application is a divisional of U.S. Pat. application Ser. No. 08/548,854, filed Oct. 26, 1995 now U.S. Pat. Ser. No. 5,728,203.

BACKGROUND AND SUMMARY OF THE INVENTION

The present invention relates to a composition that is useful to protect and promote adhesion to a metallic substrate, particularly aluminum.

Currently, there are numerous commercial methods for treating metal substrates to prepare them for application of overcoats. These methods are occasionally referred to as conversion treatments. One such method is known as the ALODINE method available from Parker Amchem. According to this method, the substrate is etched with phosphoric acid and then rinsed. A conversion composition then is prepared from a concentrate that includes hexavalent chrome. This conversion composition then is flowed over the etched surface. Another method is a 9 to 13 step method that involves a manganese conversion coating that includes the application of heat.

Consequently, it would be very advantageous to provide a chrome-free, low volatile organic, shelf stable protective and adhesion promoting composition for a metal substrate. It would also be advantageous if this composition could be applied to the substrate via a single pack system that requires only a few steps.

Coating compositions that are made from or include in general a silane, water and phosphoric acid are known (see U.S. Pat. No. 4,098,749; U.S. Pat. No. 5,091,469; and DE-A-4403876).

DE-A-4403876 discloses a composition that is said to form a passivating layer that is a polysiloxane structure that includes phosphorus-oxygen links (Si—O—Si—O—P—O—Si) when coated on a metal substrate. In order to achieve this structure, it is alleged that "the percentage of phosphoric acid must be higher than required for mere catalysis." However, the single example includes only approximately 1 wt % phosphoric acid. In addition, an organic solvent (ethylene glycol monomethyl ether) and an alcohol (methanol or 2-propanol) are used as initial components to make the coating composition. This application also indicates that the coating bath is maintained at a pH of <7, preferably a pH of 5 and 6.

Claim 1 of U.S. Pat. No. 4,098,749 claims an anticorrosion primer coating composition comprising 100 parts by weight (pbw) polyvinyl butyral resin, 1–25 pbw of at least one organofunctional silane, 20–35 pbw of an inorganic borate and/or polyphosphate compound, and 5 to 50 pbw phosphoric acid. Upon close inspection of the examples in the U.S. Pat. No. 4,098,749 patent it is clear that the pbw ranges recited in claim 1 do not take into account the weight of any carriers such as an organic solvent or water.

The largest amount of phosphoric acid in any of the examples appears to be in Example 13. 18 pbw of an 85% aqueous solution of phosphoric acid is mixed with 16 pbw water and 66 pbw isopropyl alcohol to form an "additive" composition. 20 parts of this "additive" is mixed with 80 parts of a main composition that includes the polyvinyl butyral and the silane. Based on this description, the calculated amount of phosphoric acid in the final coating composition is 3.6 wt %. It is also clear from the examples that the U.S. Pat. No. 4,098,749 system is a two pack system and that it includes an organic solvent.

SUMMARY OF THE INVENTION

According to the invention there is provided an aqueous composition for applying to and treating metallic substrates that does not include chrome or chromium-containing compound, does not include an organic solvent, is shelf stable for at least 6 months and promotes adhesion of overcoat layers that are applied to the metallic substrate. The composition can be applied as a single pack system at ambient conditions.

In a preferred embodiment the composition is an aqueous solution that includes of at least two hydrolyzed silanes, at least about 20 weight percent phosphoric acid based on the total weight of the composition, and water, wherein the composition has a pH of less than or equal to 3 and is substantially free of organic solvent and any chromium-containing compound. In another embodiment the composition may include only a single hydrolyzed silane that is selected from the group consisting of hydrolyzed aminopropyltriethoxysilane, hydrolyzed tetraethoxysilane, hydrolyzed glycidoxypropltrimethoxysilane, hydrolyzed N-β-(amino ethyl)-γ-aminopropyltriethoxysilane and hydrolyzed ethyltriethoxysilane.

The present invention also provides a method for applying a chromium-free treatment on a metallic substrate comprising applying to the metallic substrate the above-described composition, rinsing the treated metallic substrate with water and drying the metallic substrate.

According to a further embodiment there is provided a metallic substrate that includes at least one overcoat layer wherein the metallic substrate has been treated prior to application of the overcoat layer with the above-described composition.

DETAILED DESCRIPTION OF THE PREFERRED EMBODIMENTS

The composition of the invention is prepared by mixing at least one silane (preferably at least two silanes), water, phosphoric acid and other minor components.

The phosphoric acid is present in the composition (both the initial composition and the final composition) in an amount of at least approximately 20 weight percent, based on the total weight of the composition. As used herein, "final composition" means the composition that is applied to the metallic substrate. As used herein, "initial composition" means the composition as it is initially formulated or mixed prior to the hydrolyzation of the silane or silanes. Phosphoric acid is the main component in the final composition. As used herein, "main component" means the component that is present in the largest amount by weight in the final composition, excluding the water, Typically there is not a specific limit on the amount of phosphoric acid, but in general the composition can include up to 50 weight percent phosphoric acid. Above 50 weight percent phosphoric acid the handling of the composition can become problematic. The phosphoric acid usually is in the form of an aqueous concentration when it is mixed into the composition of the invention. The aqueous concentration can contain 85 to 100, preferably 85, weight percent phosphoric acid. The phosphoric acid typically is orthophosphoric acid, but could be metaphosphoric acid, pyrophosphoric acid or polyphosphoric acid.

According to one embodiment of the invention it is possible to form stable compositions according to the invention with only one type of silane such as γ-aminopropyltriethoxysilane, tetraethoxysilane, glycidoxypropyltrimethoxysilane, N-β-(amino ethyl)-γ-aminopropyltriethoxysilane and ethyltriethoxysilane and similar silanes.

According to a preferred embodiment, however, the composition is formed from at least two different types of silanes. As shown in Table 2 below, some single silane compositions are unstable. If at least two silanes are used, however, the resulting compositions are stable. In addition, the compositions that include at least two silanes display more versatility in their usefulness on various types of metallic substrates.

Silanes that can be employed in the preferred embodiment can be any silane that is hydrolyzable, typically an organo functional silane. Representative silanes include aminoalkoxy silanes such as γ-aminopropyltriethoxysilane, N-β (amino ethyl)-γ-aminopropyltriethoxysilane, aminomethyltriethoxysilane, aminomethyldiethoxysilane and γ-aminoisobutyltrimethoxysilane; alkoxy silanes such as tetraethoxysilane, tetramethoxysilane and triethoxysilane; aklylalkoxy silanes such as methyltrimethoxysilane and ethyltriethoxysilane; epoxy silanes such as epoxy cyclohexyl silane; epoxyalkoxy silanes such as glycidoxypropyltrimethoxysilane; vinyl silanes such as vinyl trimethoxysilane, methacryloxypropylmethoxysilane and vinyl-tris(2-methoxyethoxy) silane; sulfur-containing silanes such as mercaptopropyl silane; and aromatic alkoxy silanes such as phenyltriethoxysilane. It is preferred that an aminoalkoxy silane be at least one of the silanes. A particularly preferred combination is γ-aminopropyltriethoxysilane and tetraethoxysilane.

The amount of silane or silanes that is formulated or initially mixed into the composition may vary, but can range from 10 to 60, preferably 10 to 30, weight percent, based on the weight of the initial composition. In either embodiment the amount of silane or silanes should not be greater than the amount of phosphoric acid in the final composition. If insufficent silane is employed, there will be inadequate adhesion between the substrate and overcoat layers applied after the composition according to the invention. If excess silane is employed, the composition will be or become unstable.

Other minor components can be added to the composition to optimize the composition for a specific use. For example, a wetting agent for the metallic substrate can be added to counteract the high surface tension due to the large amount of water present in the composition. A coloring agent can be added so that the applicator can see the composition as it is applied to the substrate. A rheology additive can be employed to modify the flow or sag characteristics of the composition.

An alcohol is not employed as an initial component for mixing or formulating the composition, but at least one water-miscible alcohol is generated in the final composition via hydroylzation of the silanes. The water-miscible alcohols that are generated will depend upon the silanes used in formulating the composition. For example, if γ-aminopropyltriethoxysilane and tetraethoxysilane are employed, ethanol should be the alcohol that is generated in the most significant quantity. Other types of alcohols that could be generated include isopropanol, butyl alcohol and similar alcohols. The amount of the alcohol component in the final composition may vary, but should in general range from 1 to 40, preferably 20 to 30, weight percent, based on the total weight of the final composition.

In certain circumstances, minor amounts of other by-products such as acetic acid could be generated by the mixing of the silanes and water.

An organic solvent is not required for formulation and it is not present in the initial or final composition.

A surprising feature of the invention is the stability of the composition even though phosphoric acid and hydrolyzed silanes are present. The silanes do not react with each other, there is no phase separation between an aqueous phase and the silanes, and there is substantially no formation of any precipitate. The phosphoric acid acts to compatibilize the silanes and to promote the formation of a single phase continuous solution between the silanes and water.

The composition of the invention can be made in any manner by mixing together the water, phosphoric acid, silane(s) and any minor components. The phosphoric acid should be added in a slow and controlled manner to prevent phase separation between the water and the silanes. The reaction between the water and the silanes hydrolyzes the silanes and generates alcohols as by-products. The final composition is an aqueous solution that includes the hydrolyzed silanes, phosphoric acid and an alcohol component.

The pH during and after mixing must be maintained at 3 or below to avoid the formation of an undesirable gel or condensate. The pH can be controlled via the phosphoric acid or the addition of amine triethylamine. Any minor components that are added should be at least neutral so that the pH of the composition is not above 3.

The composition remains shelf stable for at least six, preferably at least twelve months. Since there is no need to keep any components of the composition separate before applying the composition to a substrate, the composition can be applied as a one pack system thus avoiding the time-consuming step of pre-mixing a two pack system.

The composition is applied to the metallic substrate under ambient conditions and should be allowed to remain in contact with the substrate for approximately 1 minute to 24 hours. A significant advantage of the invention is that the composition can be effectively applied to a metallic substrate at room temperature. In other words, no heating is required when the composition is applied. The metallic substrate is then rinsed with deionized water to remove excess phosphoric acid and orthosilicic acid that is in solution on the surface of the substrate. Upon drying of the substrate, a coating has formed on the surface of the substrate that provides corrosion resistance and promotes that adhesion of any overcoats that may be applied to the substrate.

A primer for added corrosion protection can be applied onto the coating formed by the composition of the invention. This primer typically is an epoxy-based or polyurethane-based composition. One such chromate-free epoxy-based primer is available from Lord Corp. under the tradename Aeroglaze® 9740 primer. Water-borne epoxy primers that meet U.S. military specification MIL-P-85582 and two pack solvent-borne epoxy primers that meet U.S. military specification MIL-P-23377 such as those available from Deft Chemical, Dexter Chemical and Courtaulds PRC can also be used.

A topcoat can then be applied to the primer coating to provide additinal protection and aesthetics. This topcoat typically is a urethane-based composition such as a high solids, moisture-cured urethane-based topcoat available from Lord Corp. under the tradename Aeroglaze® A3211V or a solvent-borne polyurethane topcoat available from Lord Corp. under the tradenames Aeroglaze® K3202 and K3309. Other topcoats that meet U.S. military specification MIL-C-85285 can also be used. Epoxy/polyamide topcoats that meet U.S. military specification MIL-P-24441 or MIL-C-

22750 also can be used. Still other topcoats that could be used include vinyl, alkyd, oil-based and baked polyester topcoats.

The coating formed on the substrate according to the invention exhibits significantly superior adhesion promotion for overcoat layers such as the above-described primer and/or topcoat and contributes corrosion and environmental protection. In addition, metallic substrates that have been treated or coated with the composition of the invention and overcoat layers exhibit superior flexibility compared to conventional protective layers or pre-treatments.

In general the composition of the invention is useful for applying to any type metallic substrate that has a surface that requires protection from corrision and other environmental deterioration. Such metallic substrates include aluminum, steel and stainless steel. The composition is particularly useful for aluminum.

Amount of phosphoric acid

A series of examples were prepared to illustrate the importance of the amount of the phosphoric acid. The amount in grams of each component of the composition is shown in Table 1.

TABLE 1

|  | Water | Phosphoric acid g (wt. %) | A1100 silane | SILBOND PURE silane |
| --- | --- | --- | --- | --- |
| Example 1 | 60.00 | 39.00 (28.9) | 24.00 | 12.00 |
| Example 2 | 60.00 | 29.25 (23.4) | 24.00 | 12.00 |
| Example 3 | 60.00 | 24.38 (20.3) | 24.00 | 12.00 |
| Comparative Example 4 | 60.00 | 19.50 (16.9) | 24.00 | 12.00 |
| Comparative Example 5 | 60.00 | 9.75 (9.2) | 24.00 | 12.00 |
| Comparative Example 6 | 60.00 | 3.90 (3.9) | 24.00 | 12.00 |
| Comparative Example 7 | 60.00 | 0.00 (0.0) | 24.00 | 12.00 |

The water and 85 wt % aqueous phosphoric acid were first mixed together. The two silanes were pre-blended prior to mixing with the water/phosphoric acid mixture. A1100 silane is γ-aminopropyltriethoxysilane and SILBOND PURE is tetraethoxysilane, both available from OSI Specialty Chemicals. The silane mixture was slowly added to water/phosphoric acid mixture while mixing. The complete solution was mixed for 10 minutes.

The mixtures were observed for separation between the silanes and the water and/or formation of a condensate or precipitate. One hour after the mixing, Comparative Examples 4–7 showed beginning separation. Approximately 24 hours later, Examples 1–3 were clear and displayed no separation. Comparative Examples 4–7 exhibited substantial phase separation that increased as the amount of phosphoric acid decreased and contained white crystalline condensate or precipitate or a milky white appearance.

Single silane composition

A series of examples was prepared to illustrate the stability and performance of compositions that included only one silane. Examples having various compositions were prepared as described above in connection with the examples evaluating the level of phosphoric acid.

All of the single silane examples included 50.00 g phosphoric acid, 200.00 g water and 50.00 g of the following silanes:

Example 8 - γ-aminopropyltriethoxysilane

Example 9 - tetraethoxysilane

Example 10 - glycidoxypropyltrimethoxysilane

Comparative Example 11 - epoxy cyclohexyl silane

Comparative Example 12 - phenyltriethoxysilane

Comparative Example 13 - methacryloxypropylmethoxysilane

Comparative Example 14 - vinyl-tris(2-methoxyethoxy) silane

Comparative Example 15 - methyltrimethoxysilane

Comparative Example 16 - vinyltrimethoxysilane

The stability of these compositions was observed as identified above. Examples 8–10 remained stable. Comparative Example 11 was not stable because a cloudy precipitate or condensate formed. Comparative Examples 12–16 were not stable because there was phase separation.

Examples 8–10 displayed limited performance characteristics when coated on aluminum or steel substrates. Each mixture was brushed on the substrate and after 10 minutes the substrate was rinsed with water. Each substrate then was coated with Aeroglaze® 9740 primer from Lord Corp. and allowed to dry. A set of the substrates coated with the primer was set aside for testing. Another set of primer-coated substrates was coated with Aeroglaze® A3211V topcoat from Lord Corp. and allowed to dry. Adhesion tests according to ASTM D 3359-92A were performed on each substrate. If a portion of the coating was pulled from the substrate, the substrates are listed as failing. Impact resistance tests according to ASTM D 2794-93 were performed on each substrate. If the coated substrates cracked as a result of the indicated impact, they are listed as failing. The results are depicted in Table 2.

TABLE 2

|  | Aluminum - A3211 & 9740 | Aluminum - 9740 | Steel - A3211 & 9740 | Steel - 9740 |
| --- | --- | --- | --- | --- |
| Example 8 | Passed impact (80 in-lb) | Failed impact (80 in-lb) | Passed impact (160 in-lb) | Failed impact (20 in-lb) |
|  | Failed adhesion | Passed adhesion | Passed adhesion | Passed adhesion |
| Example 9 | Passed impact (80 in-lb) | Failed impact (80 in-lb) | Passed impact (160 in-lb) | Failed impact (20 in-lb) |
|  | Failed adhesion | Passed adhesion | Passed adhesion | Passed adhesion |
| Example 10 | Failed impact (80 in-lb) | Failed impact (80 in-lb) | Passed impact (160 in-lb) | Failed impact (20 in-lb) |
|  | Failed adhesion | Passed adhesion | Passed adhesion | Passed adhesion |
| Comparative Example 11 | Passed impact (80 in-lb) | Failed impact (80 in-lb) | Passed impact (160 in-lb) | Failed impact (20 in-lb) |
|  | Failed adhesion | Passed adhesion | Passed adhesion | Passed adhesion |

TABLE 2-continued

|  | Aluminum - A3211 & 9740 | Aluminum - 9740 | Steel - A3211 & 9740 | Steel - 9740 |
| --- | --- | --- | --- | --- |
| Comparative Example 12 | N.A. | N.A. | N.A. | N.A. |
| Comparative Example 13 | N.A. | N.A. | N.A. | N.A. |
| Comparative Example 14 | N.A. | N.A. | N.A. | N.A. |
| Comparative Example 15 | N.A. | N.A. | N.A. | N.A. |
| Comparative Example 16 | Passed impact (80 in-lb) Passed adhesion | Failed impact (80 in-lb) Passed adhesion | Passed impact (160 in-lb) Passed adhesion | Failed impact (20 in-lb) Passed adhesion |

N.A. - comparative example was not applied to substrate because of the phase separation Two silane compositions A series of examples was prepared to illustrate the stability and performance of compositions that included two silanes. Examples having various compositions were prepared as described above in connection with the examples evaluating the level of phosphoric acid.

All of the two silane examples included 50 g water, 200 g phosphoric acid, 25 g γ-aminopropyltriethoxysilane and 25 g of the following second silane:

Example 17 - tetraethoxysilane
Example 18 - glycidoxypropyltrimethoxysilane
Example 19 - methacryloxypropylmethoxysilane
Example 20 - vinyl-tris(2-methoxyethoxy)silane
Example 21 - methyltrimethoxysilane The stability of these examples was observed as described above. All of the Examples 17–21 formed a stable solution.

Each mixture was brushed on an aluminum substrate and a steel substrate and after 10 minutes the substrates were rinsed with water. Each substrate then was coated with Aeroglaze® 9740 primer from Lord Corp. and allowed to dry. Each primer-coated substrate then was coated with Aeroglaze® A3211V topcoat from Lord Corp. and allowed to dry. Adhesion tests according to ASTM D 3359-92A were performed on each primer and topcoat-coated substrate. All the substrates passed the adhesion test, except the aluminum substrate coated with Example 19.

What is claimed is:

1. A method for applying a chromium-free treatment on a metallic substrate comprising:
   (a) applying to the metallic substrate an aqueous composition comprising an aqueous solution of at least one hydrolyzed silane, at least about 20 weight percent phosphoric acid based on the total weight of the composition, and water, wherein the composition has a pH of less than or equal to 3, is substantially free of organic solvent and any chromium-containing compound and, if the composition includes only a single hydrolyzed silane, the single hydrolyzed silane is selected from the group consisting of hydrolyzed aminopropyltriethoxysilane, hydrolyzed tetraethoxysilane, hydrolyzed glycidoxypropyltrimethoxysilane, hydrolyzed N-β-(amino ethyl)-γ-aminopropyltriethoxysilane and hydrolyzed ethyltriethoxysilane,
   (b) rinsing the treated metallic substrate with water, and
   (c) drying the metallic substrate.

2. A method according to claim 1 wherein steps (a) and (b) are performed at ambient conditions.

3. A method according to claim 1 wherein the metallic substrate is aluminum and the aqueous composition includes at least two hydrolyzed silanes.

4. A method according to claim 3 wherein the silanes are selected from the group consisting of hydrolyzed aminoalkoxysilane, hydrolyzed alkoxy silane, hydrolyzed alkylalkoxysilane, hydrolyzed epoxy silane, hydrolyzed epoxy alkoxy silane, hydrolyzed vinyl silane, hydrolyzed sulfur-containing silane and hydrolyzed aromatic alkoxy silane.

5. A method according to claim 1 wherein the aqueous composition further comprises at least one alcohol.

6. A method according to claim 1 wherein the aqueous composition includes at least one hydrolyzed aminoalkoxy silane.

7. A method according to claim 6 wherein the hydrolyzed aminoalkoxysilane is hydrolyzed γ-aminopropyltriethoxysilane.

8. A method according to claim 1 further comprising applying at least one overcoat to the dried metallic substrate.

9. A method according to claim 8 wherein the overcoat is a primer selected from the group consisting of an epoxy-based primer and a polyurethane-based primer.

10. A method according to claim 8 wherein the overcoat is a topcoat selected from the group consisting of urethane-based topcoat, vinyl topcoat, alkyd topcoat, epoxy/polyamide topcoat, oil-based topcoat and baked polyester topcoat.

11. A method according to claim 1 wherein the phosphoric acid is selected from the group consisting of orthophosphoric acid, metaphosphoric acid, pyrophosphoric acid and polyphosphoric acid.

12. A metallic substrate that includes at least one overcoat layer wherein the metallic substrate has been treated prior to application of the overcoat layer with an aqueous composition comprising an aqueous solution of at least one hydrolyzed silane, at least about 20 weight percent phosphoric acid based on the total weight of the composition, and water, wherein the composition has a pH of less than or equal to 3, is substantially free of organic solvent and any chromium-containing compound and, if the composition includes only a single hydrolyzed silane, the single hydrolyzed silane is selected from the group consisting of hydrolyzed aminopropyltriethoxysilane, hydrolyzed tetraethoxysilane, hydrolyzed glycidoxypropyltrimethoxysilane, hydrolyzed N-β-(amino ethyl)-γ-aminopropyltriethoxysilane and hydrolyzed ethyltriethoxysilane.

13. A metallic substrate according to claim 12 wherein the metallic substrate is aluminum and the aqueous composition includes at least two hydrolyzed silanes.

14. A metallic substrate according to claim 13 wherein the silanes are selected from the group consisting of hydrolyzed aminoalkoxysilane, hydrolyzed alkoxy silane, hydrolyzed alkylalkoxysilane, hydrolyzed epoxy silane, hydrolyzed epoxy alkoxy silane, hydrolyzed vinyl silane, hydrolyzed sulfur-containing silane and hydrolyzed aromatic alkoxy silane.

15. A metallic substrate according to claim 12 wherein the aqueous composition further comprises at least one alcohol.

16. A metallic substrate according to claim 12 wherein the overcoat is a primer selected from the group consisting of an epoxy-based primer and a polyurethane-based primer.

17. A metallic substrate according to claim 12 wherein the overcoat is a topcoat selected from the group consisting of urethane-based topcoat, vinyl topcoat, alkyd topcoat, epoxy/polyamide topcoat, oil-based topcoat and baked polyester topcoat.

18. A metallic substrate according to claim 12 wherein the phosphoric acid is selected from the group consisting of orthophosphoric acid, metaphosphoric acid, pyrophosphoric acid and polyphosphoric acid.

* * * * *